United States Patent
Tam et al.

(10) Patent No.: US 10,169,969 B2
(45) Date of Patent: Jan. 1, 2019

(54) RFID-ENHANCED AND LOCATION DETECTION IN A JEWELRY SHOPPING EXPERIENCE

(71) Applicant: ELECTRONIC COMMODITIES EXCHANGE, New York, NY (US)

(72) Inventors: Simon Tam, Medina, WA (US); Brian Watkins, Seattle, WA (US); Timothy Lawrence Swetonic, Seattle, WA (US); Jeffrey Allan Johnston, Seattle, WA (US)

(73) Assignee: ELECTRONIC COMMODITIES EXCHANGE, L.P., New York, NY (US)

( * ) Notice: Subject to any disclaimer, the term of this patent is extended or adjusted under 35 U.S.C. 154(b) by 0 days.

(21) Appl. No.: 14/727,506

(22) Filed: Jun. 1, 2015

(65) Prior Publication Data

US 2015/0348384 A1    Dec. 3, 2015

Related U.S. Application Data

(60) Provisional application No. 62/005,027, filed on May 30, 2014.

(51) Int. Cl.
*G08B 13/14* (2006.01)
*G08B 13/24* (2006.01)
(Continued)

(52) U.S. Cl.
CPC ..... *G08B 13/2402* (2013.01); *G06K 7/10128* (2013.01); *G06K 17/0022* (2013.01); *G06Q 30/00* (2013.01); *G06K 2017/0045* (2013.01)

(58) Field of Classification Search
CPC ........ G06Q 30/02; G06Q 20/32; G06Q 30/00; G06F 17/30112; G08B 13/2471;
(Continued)

(56) References Cited

U.S. PATENT DOCUMENTS

| 2005/0033689 A1* | 2/2005 | Bonalle | G06Q 20/00 705/40 |
| 2005/0165784 A1* | 7/2005 | Gomez | G06F 17/30879 |

(Continued)

FOREIGN PATENT DOCUMENTS

CN    20101217421    7/2010

OTHER PUBLICATIONS

Notification of Transmittal of the International Search Report and the Written Opinion of the International Searching Authority for International Application No. PCT/US15/33562 dated Aug. 26, 2015 (7 pages).

(Continued)

*Primary Examiner* — Don N Vo

(57) ABSTRACT

Systems, methods and apparatus for in-store preview of jewelry items that comprise detecting that a RFID tag that is coupled to a jewelry item is within a threshold vicinity of a RFID reader. The information about the jewelry item is transmitting to an electronic device that is located proximately to the jewelry counter. Beacon technology is employed to communicate with a customer's mobile device. Pass application technology is employed to transmit records to and from a customer and local retailer.

20 Claims, 9 Drawing Sheets

(51) Int. Cl.
*G06Q 30/00* (2012.01)
*G06K 7/10* (2006.01)
*G06K 17/00* (2006.01)

(58) Field of Classification Search
CPC ........... G08B 13/2402; G06K 17/0022; G06K 7/10128; G06K 2017/0045
USPC ...................................................... 340/572.1
See application file for complete search history.

(56) References Cited

U.S. PATENT DOCUMENTS

| | | | |
|---|---|---|---|
| 2006/0202832 A1 | 9/2006 | Reznik et al. | |
| 2007/0080785 A1* | 4/2007 | Son .................... | G06K 7/10079 340/10.1 |
| 2008/0129513 A1* | 6/2008 | Bielas ................ | G08B 13/2462 340/572.7 |
| 2008/0249899 A1* | 10/2008 | Nasser ................ | G06Q 10/087 705/28 |
| 2008/0308630 A1* | 12/2008 | Bhogal ................ | G06Q 30/02 235/383 |
| 2010/0148934 A1 | 6/2010 | Nasser | |
| 2011/0050425 A1 | 3/2011 | Lee | |
| 2012/0055985 A1* | 3/2012 | Allen .................... | G06Q 10/087 235/375 |
| 2012/0150758 A1* | 6/2012 | Belady ................ | G06Q 30/018 705/317 |
| 2012/0166241 A1* | 6/2012 | Livingston ............ | G06Q 30/00 705/7.12 |
| 2013/0074543 A1 | 3/2013 | Vahid | |
| 2013/0208085 A1 | 8/2013 | Marion et al. | |
| 2013/0218714 A1 | 8/2013 | Watkins et al. | |
| 2013/0226646 A1 | 8/2013 | Watkins et al. | |
| 2014/0052563 A1 | 2/2014 | Watkins et al. | |
| 2014/0292477 A1* | 10/2014 | Ahmadloo ......... | G06K 7/10168 340/5.8 |
| 2015/0025967 A1* | 1/2015 | Ellison ............... | G06Q 30/0261 705/14.53 |
| 2015/0235063 A1* | 8/2015 | Loussert ............ | G06K 7/10316 340/10.1 |
| 2015/0278905 A1 | 10/2015 | Watkins et al. | |

OTHER PUBLICATIONS

Chinese Office Action for Application No. 201580041699.9 dated Dec. 12, 2017, 9 pages.

* cited by examiner

RFID-ENHANCED AND LOCATION DETECTION IN A JEWELRY SHOPPING EXPERIENCE

CROSS-REFERENCED APPLICATIONS

This invention claims priority to U.S. Provisional Appl. 62/005,027, entitled "Apparatus, Article of Manufacture and Methods for RFID-Enhanced Jewelry Shopping Experience," which was filed on May 30, 2014.

BACKGROUND

The proliferation of on-line shopping has significantly changed the retail landscape. Increasingly, customers are enjoying the convenience, speed and ability to browse in comfort that Internet shopping enables. Descriptions for a system, apparatus and method of virtual jewelry shopping, as well as the design of customized jewelry pieces from a remote location, are described in U.S. application Ser. Nos. 13/837,374; 13/837,495; 13/837,610; 13/837,18; 14/676,811 all of which are incorporated by reference herein.

Due to the expensive price tag and unique nature of fine jewelry, some customers may be hesitant to purchase luxury jewelry items sight unseen. Thus, it may be desirable for online jewelry merchants to partner with local brick-and-mortar stores in order to provide additional support, features, and opportunities for their online retail customers.

This application is generally related to RFID-enhanced shopping experience at a local brick-and-mortar store that is partnership with an online jewelry merchant. Certain applications installed on a customer's mobile device helps facilitate the storage and transport of information in a virtual wallet. Location detection technology may be used to send notifications to a customer who is within a geographic vicinity of the store.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
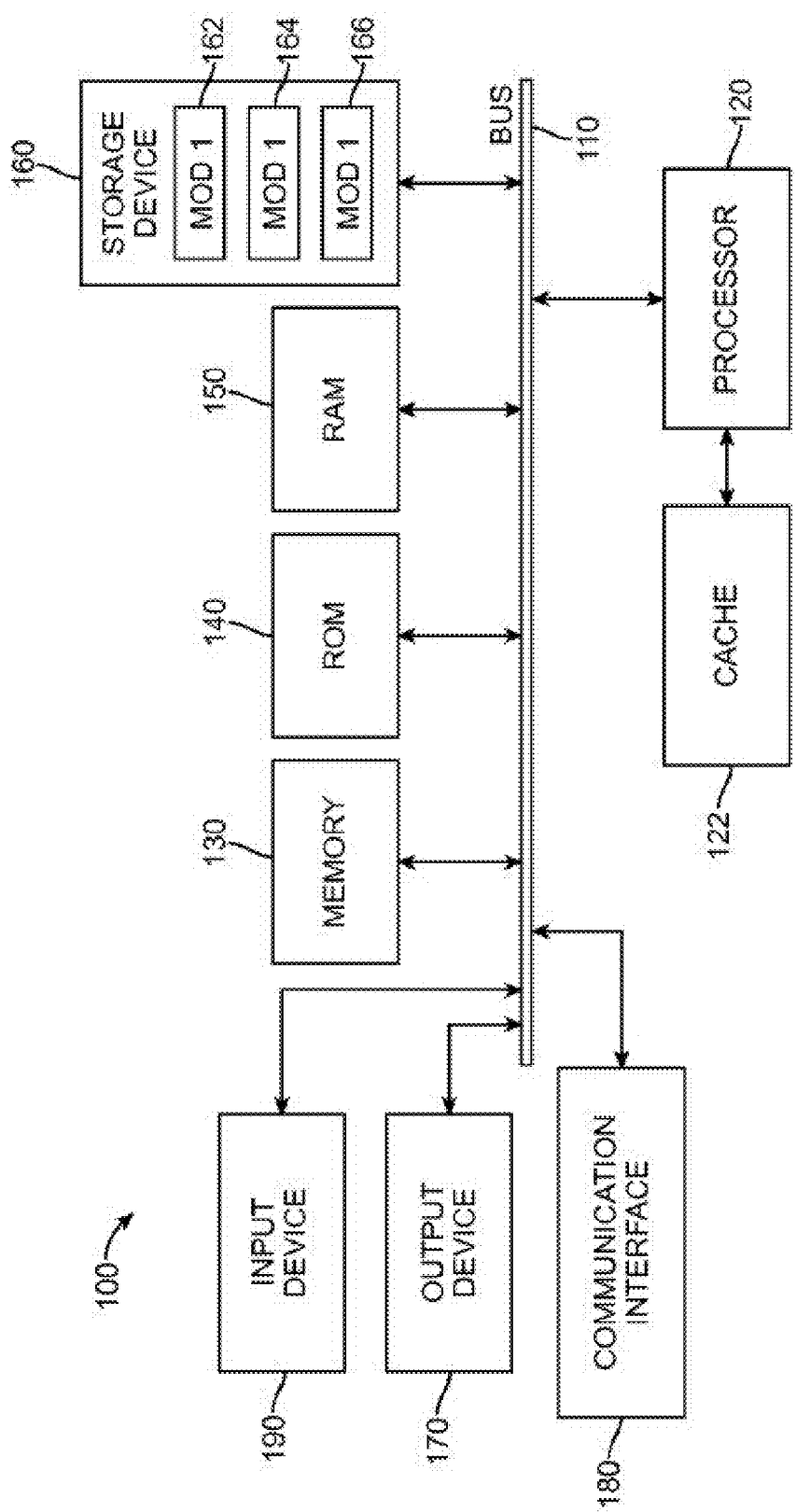
FIG. 1 illustrates an exemplary general-purpose computing device.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant, wearable technology (such as VR headsets, smart watches, smart glasses, smart rings), or any other machine adapted for executing programmable instructions in accordance with the description thereof set forth above. The embodiments of the present invention may be facilitated by any one of the electronic devices described above.

A brief introductory description of a basic general purpose system or computing device in FIG. 1, which can be employed to practice the concepts, is disclosed herein. These variations shall be discussed herein as the various embodiments are set forth. The disclosure now turns to FIG. 1.

With reference to FIG. 1, an exemplary system 400 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 400 can include a cache 122 of high speed memory connected directly with, in close proximity to, or integrated as part of the processor 120. The system 400 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the computing device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Exemplary Mobile Computing Environment

Figure 2:
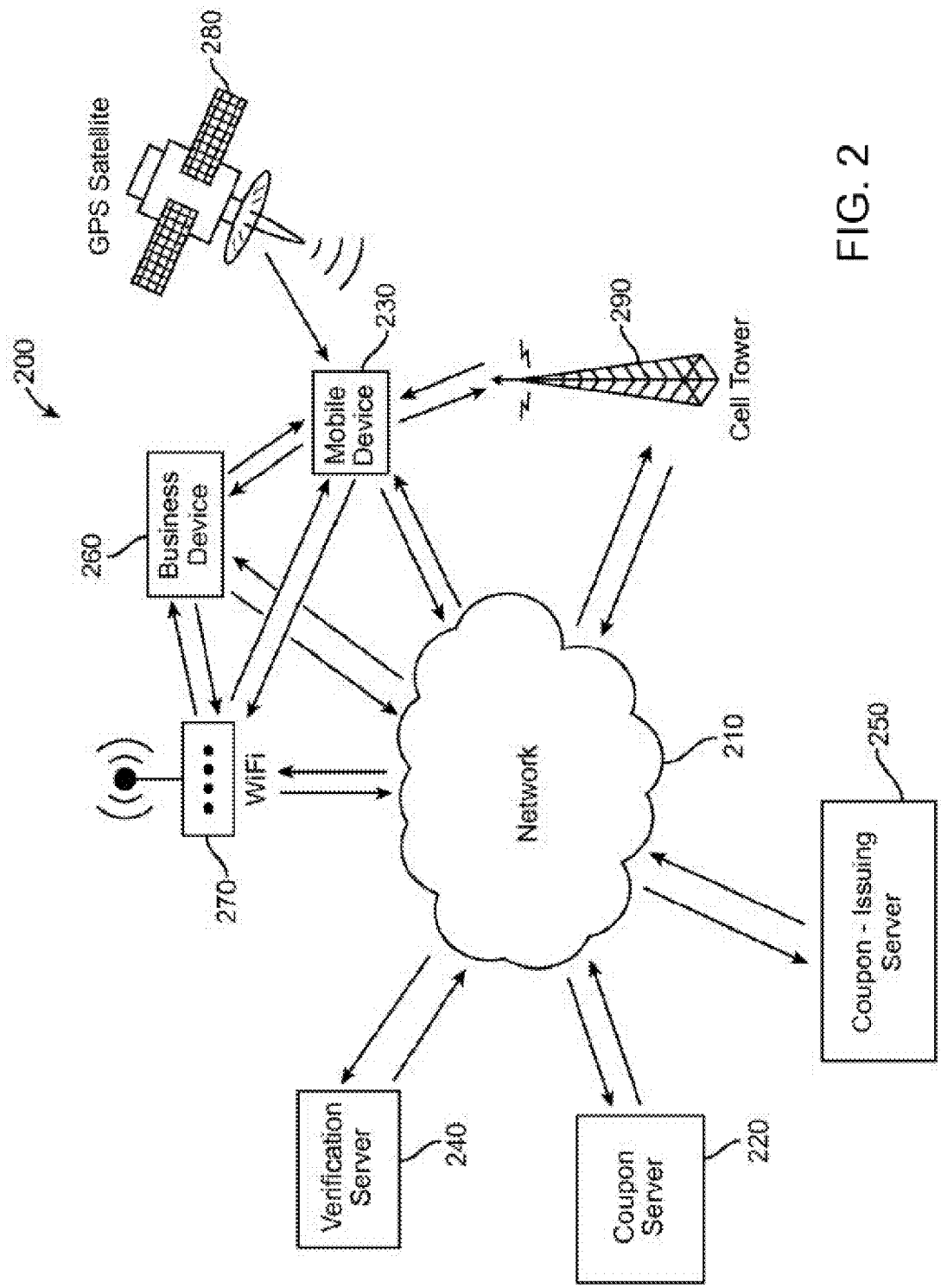
FIG. 2 illustrates an exemplary mobile computing environment.

Having disclosed some components of a computing system, the disclosure now turns to FIG. 2, which illustrates a mobile computing environment 200. A communication network 210 connects the devices and applications hosted in the computing environment 200. In computing environment 200, multiple devices can communicate with and send commands to each other. For example, a mobile device 230 or local retailer device 260, can be configured to communicate with each other or any number of servers such as a online merchant server 220, verification server 240 and in-store record server 250 through the communication network 210. A mobile device 230 can also be configured to communicate with a local retailer device 260 directly through use of, for example, a near field communication system or blue tooth technology. A mobile device 230 and local retailer device 260 can communicate through the use of a local area network by being connected to, for example, a local Wi-Fi router 270.

The mobile device 230 can be configured to store records in a wallet, or to communicate with one or more servers which store the records in the wallet. The wallet can be an application, or part of an application, for collecting online records and in-store records containing information regarding jewelry items of interest to the mobile device user. In some embodiments, the mobile device 230 can be configured to provide reminders or alerts that are helpful in reminding a user of an upcoming birthday, anniversary, holiday and/or life event.

In some embodiments, the mobile devices are preferably smart phones or post-personal computer device such as a tablet computing device. In other embodiments, the mobile device are other types of communication devices such as a cell phone, desktop or laptop computer. In another embodiment, the mobile devices are wearable technologies, such as watch, bracelet, headset, glove or glasses.

Each of the mobile devices 230 included in the computing environment 200 can include a network interface configured to establish a connection to the communication network 210. For example, mobile device 230 can establish a cellular (e.g., GSM, EDGE, 3G, or 4G) network connection that provides data access to the communication network 210. Such a connection may be facilitated by one or more cellular towers 290 located within the range of the mobile device 230 and connected to the network 210. Further, mobile device 230 can establish an IEEE 802.11 (i.e., WiFi or WLAN) network connection to the communication network 210. Such a connection may be facilitated by one or more wireless network routers 270 located within the range of the mobile device 230 and connected to the network 210. Also, the mobile devices 230 or an additional device may connect to the network 210 through the IEEE 802.16 (i.e., wireless broadband or WiBB) standard. Again, the device 230 may employ the assistance of a cell tower 290 or wireless router 270 to connect to the communication network 210.

Additionally, each of the mobile devices 230 can include an input interface, through which one or more inputs can be received. For example, the input interface can include one or more of a keyboard, a mouse, as joystick, a trackball, a touch pad, a keypad, a touch screen, a scroll wheel, general and special purpose buttons, a stylus, a video camera, and a microphone. Each of the mobile devices 230 can also include an output interface through which output can be presented, including one or more displays, one or more speakers, and a haptic interface. Further, a location interface, such as a Global Positioning System (GPS) processor, also can be included in one or more of the mobile devices 230 to receive and process signals sent from GPS satellites 280 for obtaining location information, e.g., an indication of current location. In some implementations, general or special purpose processors included in one or more of the mobile devices 230 can be configured to perform location estimation, such as through base station triangulation or through recognizing stationary geographic objects through a video interface. The mobile devices 230 can also include Bluetooth, RFID, or near-field communication technology.

In some implementations, the mobile device 230 can include one or more input/output (I/O) devices and/or sensor devices. For example, a speaker and a microphone can be included to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

In some implementations, a proximity sensor can be included to facilitate the detection of the user positioning the mobile device 230 proximate to the user's ear and, in response, to disengage the touch-sensitive display to prevent accidental function invocations. In some implementations, the touch-sensitive display can be turned off to conserve additional power when the mobile device 230 is proximate to the user's ear.

Other sensors can also be used. For example, in some implementations, an ambient light sensor can be utilized to facilitate adjusting the brightness of the touch-sensitive display. In some implementations, an accelerometer can be utilized to detect movement of the mobile device 230, as indicated by the directional arrow. Accordingly, display objects and/or media can be presented according to a detected orientation, e.g., portrait or landscape. In some implementations, the mobile device 230 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 230 or provided as a separate device that can be coupled to the mobile device 230 through an interface (e.g., port device) to provide access to location-based services.

The mobile device 230 can also include a camera lens and sensor. In some implementations, the camera lens and sensor 180 can be located on the back surface of the mobile device 230. The camera can capture still images and/or video.

The mobile device 230 can also include one or more wireless communication subsystems, such as a 802.11b/g communication device, a Bluetooth (™) communication device and/or a RFID communication device. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device, e.g., a Universal Serial Bus (USB) port, or a docking port, or some other wired port connection, can be included. The port device can, for example, be utilized to establish a wired connection to other computing devices, such as other communication devices, network access devices, a personal computer, a printer, or other processing devices capable of receiving and/or transmitting data. In some implementations, the port device allows the mobile device 230 to synchronize with a host device using one or more protocols, such as, for example, the TCP/IP, HTTP, UDP and any other known protocol. In some implementations, a TCP/IP over USB protocol can be used.

Exemplary Mobile Device Architecture

Figure 3:
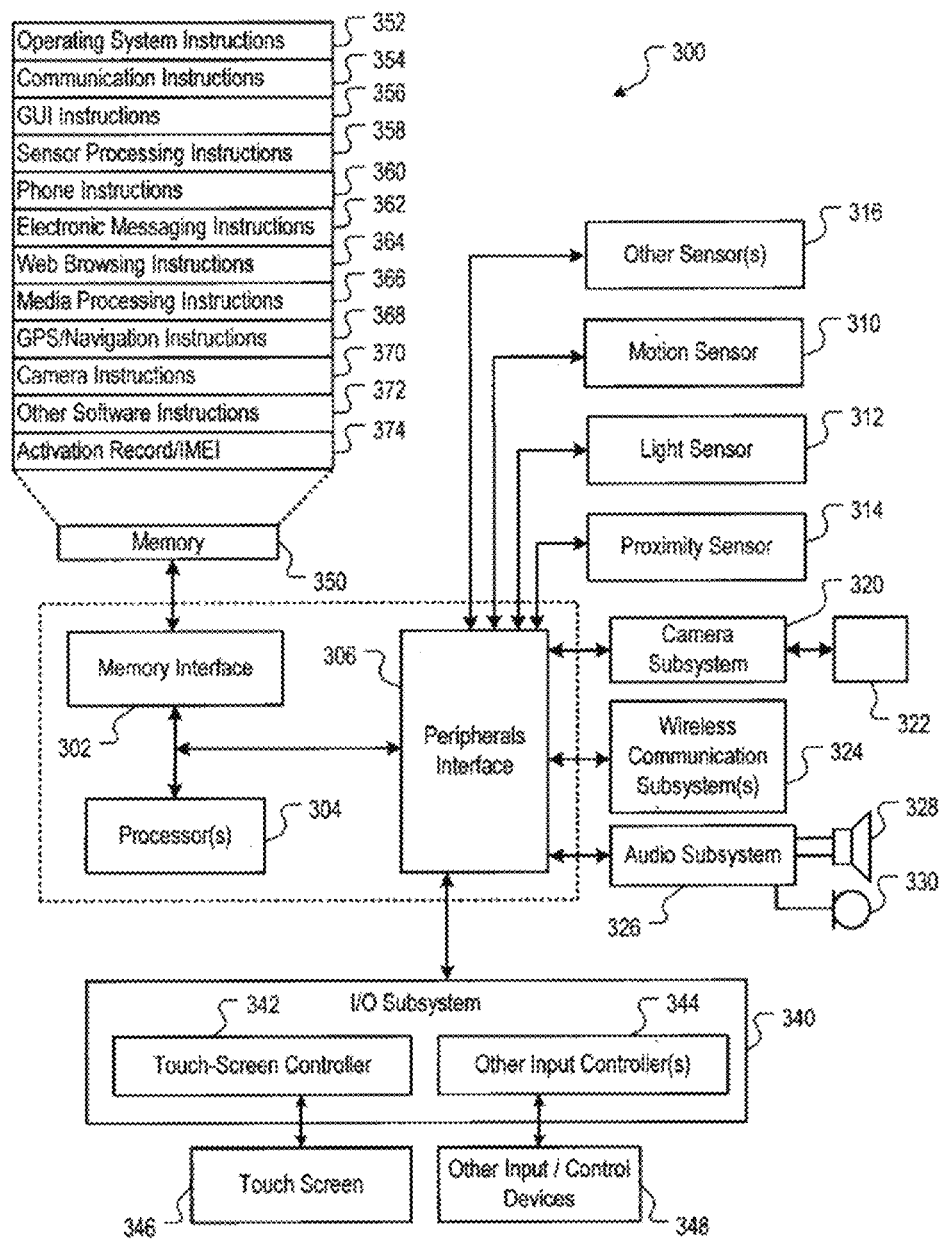
FIG. 3 is a block diagram of an exemplary implementation of mobile device of FIG. 2.

FIG. 3 is a block diagram 300 of an example implementation of the mobile device 230 of FIG. 1. The mobile device 230 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 230 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

In some implementations, the mobile device can receive positioning information from a positioning system 318. The positioning system 318, in various implementations, can be located on the mobile device, or can be coupled to the mobile device (e.g., using a wired connection or a wireless connection). In some implementations, the positioning system 318 can include a global positioning system (GPS) receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 230 is intended to operate. For example, a mobile device 230 may include communication subsystems 324 designed to operate over a GSM network, a GPRS network, an EDGE network, a Wi-Fi or WiMax network, a Bluetooth (™) network and a RFID network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 230 on or off. The user may be able to customize a functionality of one or more of the buttons. The touch screen 346 can, for example, also be used to implement virtual or soft buttons and/or a keyboard.

In some embodiments, the mobile device 230 can present recorded audio and/or video files, such as MP3, AAC, and MPEG files. In some implementations, the mobile device 230 can include the functionality of an MP3 player. The mobile device 230 may, therefore, include a 36-pin connector that is compatible with the MP3 player. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

The memory 350 can also include a preferences engine 374. The preferences engine 374 can be operable to receive user preferences as to the sorts of content the user is interested. In some implementations, the preferences can be used to filter the sorts of information that is sent to the mobile device 230. These preferences can be communicated to a media service (e.g., media service 250 of FIG. 2), and can be used by the media service to provide relevant media content based on location and/or preferences.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 230 may be implemented in hardware and/or in software, including in one or more signal processing and/or application specific integrated circuits.

Figure 4:
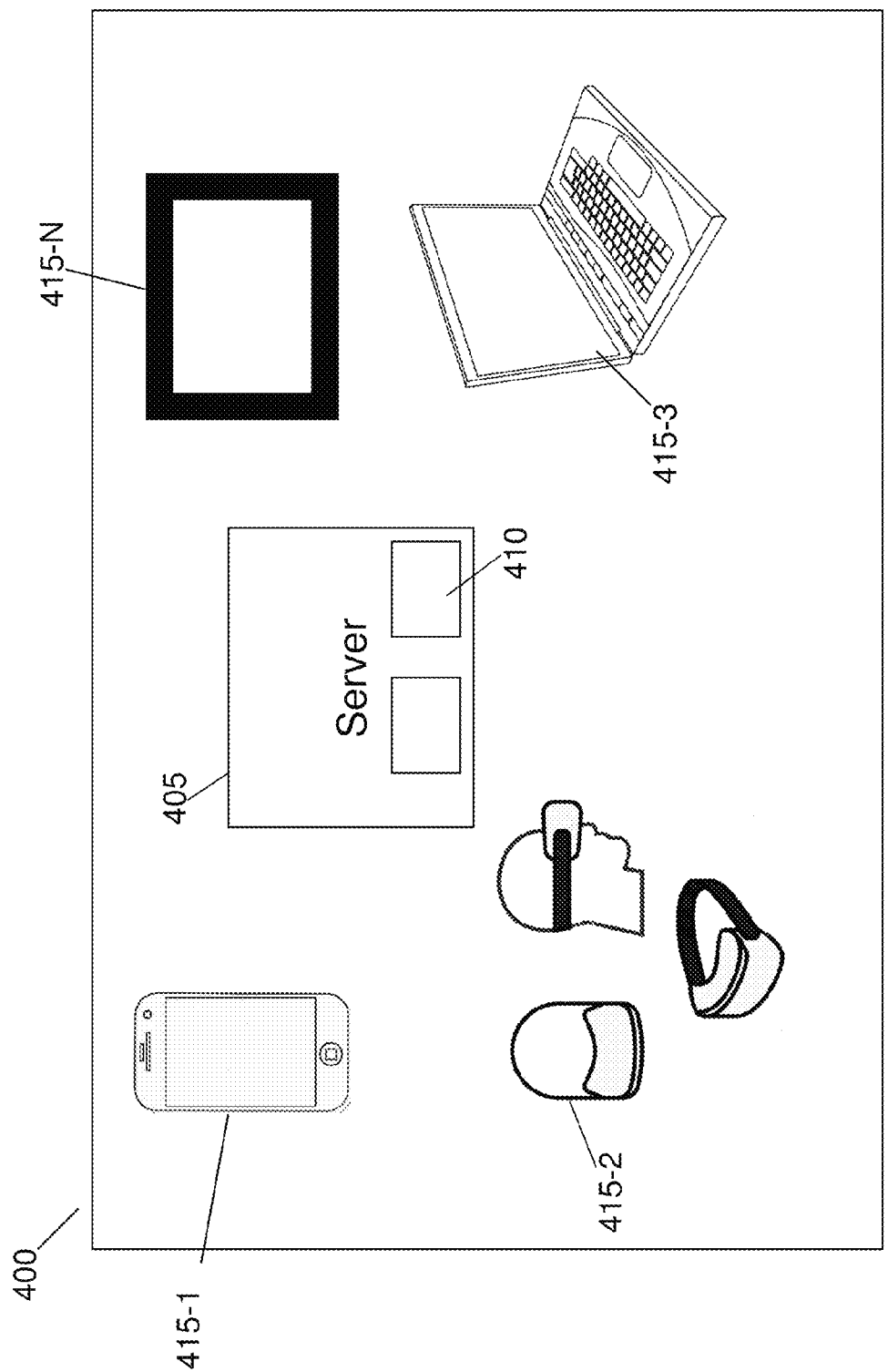
FIG. 4 illustrates an exemplary block diagram of a wireless system which may be used to facilitate remote shopping of the jewelry items according to the embodiments of the present invention.
Figure 5A:
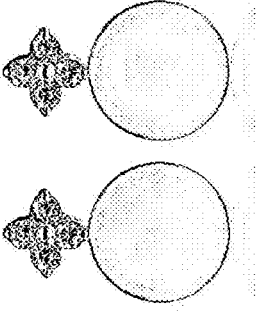
FIGS. 5a-5c illustrate some example webpages for an online merchant's jewelry shopping website.
Figure 5B:
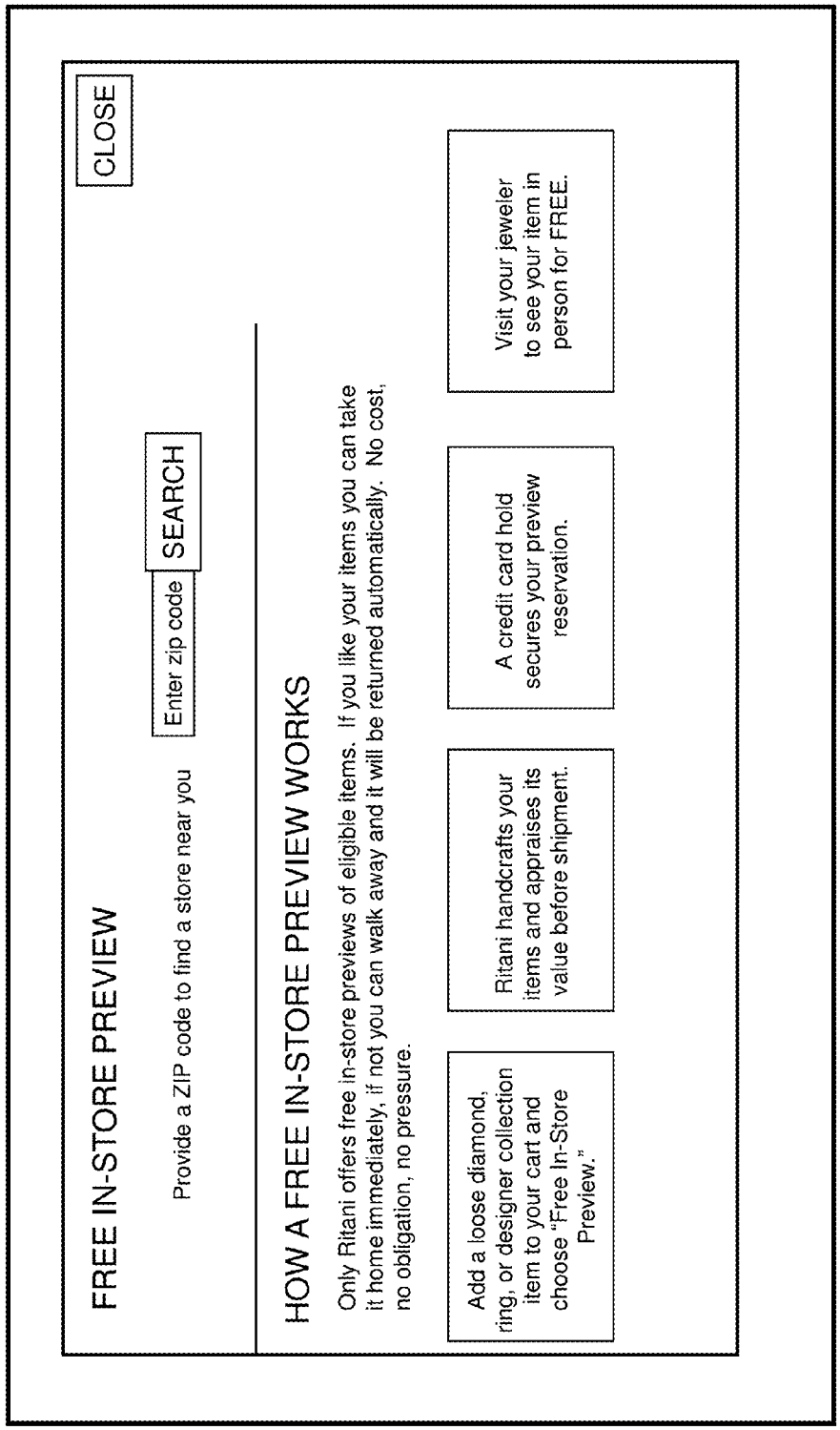
Figure 5C:
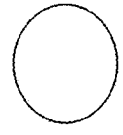

FIG. 4 illustrates an exemplary block diagram of a wireless system 400 which may be used to facilitate remote shopping of the jewelry items according to the embodiments of the present invention. The wireless system 400 comprises a server 405 that includes one or more processors 410 running software. Some examples of devices used by a customer that may be in communication with server 405, are shown in exemplary devices 415-1 through 415-N (e.g., smart phones, tablets, laptop, wearable technologies, etc.). Each of remote devices 415-1 through 415-N is configured to receive data from server 405 during the shopping of jewelry items. In one embodiment, the shopping website according to the embodiments of the present invention may be in the form of a software application ("App") that is installed onto remote devices 415-1 through 415-N. FIGS. 5*a*-5*c* illustrate some example webpages for an online merchant's jewelry shopping website. Using this website, a customer can research, browse and purchase various jewelry items. In some embodiments, the customer may interact virtually with a live jewelry consultant and/or jewelry designer in order to further the shopping experience. Additional details regarding these interactions and the various tests that can be conducted virtually on jewelry items are described in U.S. Pat. No. 8,626,601, entitled "Method and Systems for Providing an Interactive Communication Sessions with a Remote Consultant" and U.S. Publication No. 20130208085, entitled "Systems and Methods for Generating Video Imagery for a Jewelry Item", each of which are incorporated by reference in its entirety herein.

However, due to the expensive price tag and unique nature of fine jewelry, some customers may be hesitant to purchase luxury jewelry items sight unseen. For example, in purchasing loose diamonds, since no two diamonds are alike, a customer may be especially particular about seeing the actual stone in person. Thus, it may be desirable for online jewelry retailers to partner with local brick-and-mortar stores in order to provide additional features and opportunities for their online retail customers. A compensation structure is set-up between the online jewelry merchant and the local brick-and-mortar store, so that the partnership is mutually beneficial to both parties. Some embodiments of compensation structures may be found in U.S. application Ser. No. 14/676,811, entitled "Virtual Jewelry Shopping Experience with In-Store Preview," which is incorporated by reference in its entirety herein.

Figure 6:
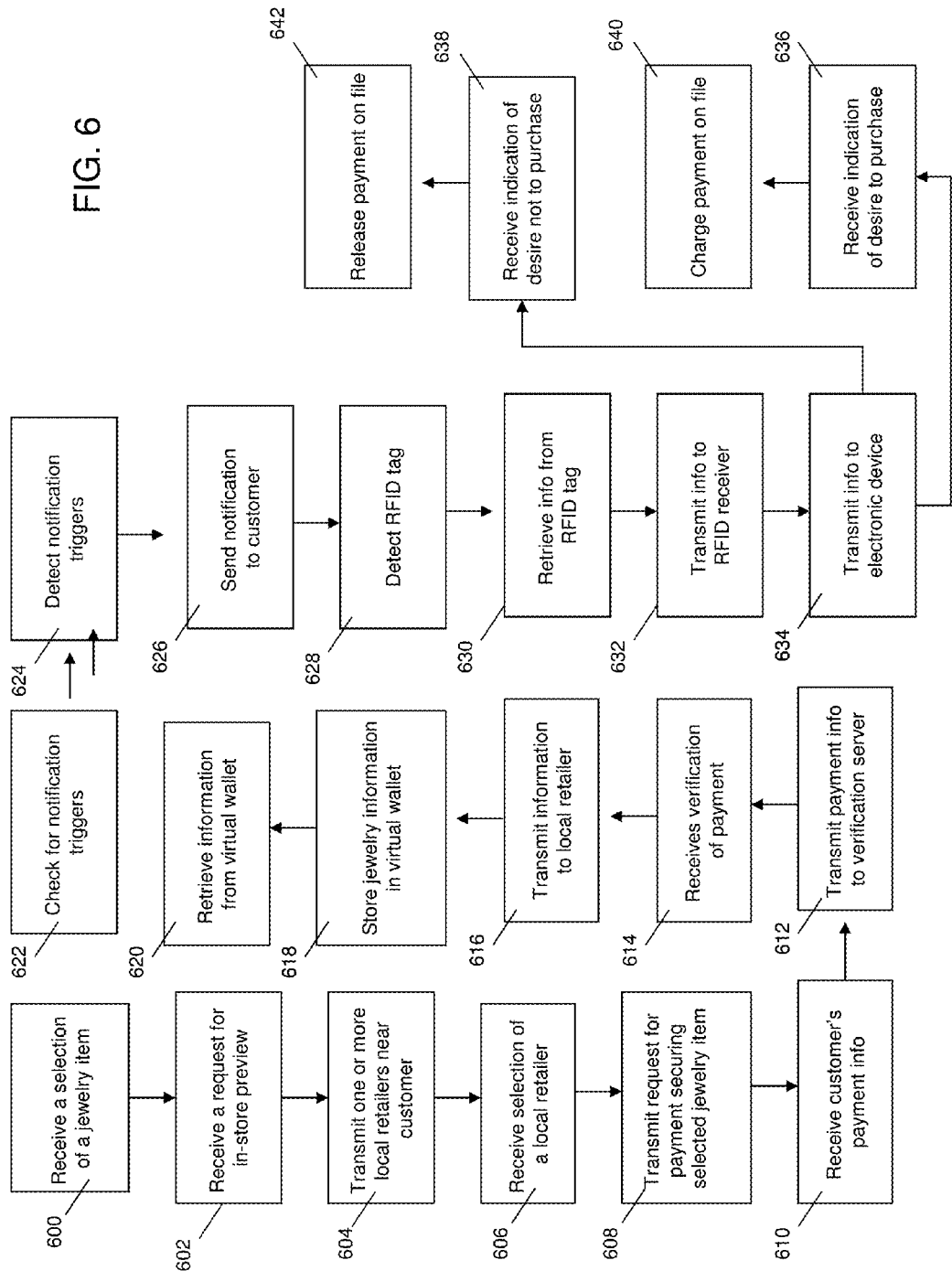
FIG. 6 illustrates a flowchart of the in-store preview process.

FIG. 6 illustrates a flowchart of the process in which a customer may request an in-store preview of a particular jewelry item at a local brick-and-mortar store. System 400 receives 600 a selection of a jewelry item (such as a ring or a loose diamond) from a customer. In one embodiment, the customer selects the jewelry item by adding into a shopping cart. In another embodiment, the customer indicates his interest in specific jewelry items via other means, such as indicating as a "favorite," placing a symbol (e.g., star), checking a box and the like. This indication of interest may be stored in the customer's online record. The customer may add or delete to his online record continuously in real-time. In one embodiment, the customer consciously adds, edits and removes the information in his online record. In other embodiments, the online record is updated automatically by the system without the customer's input. In another embodiment, the online record is both automatically updated and capable of editing by the customer.

System 400 also may receive 602 a request for in-store preview of the selected jewelry item. In one embodiment, the website has a button dedicated to "In-Store Preview," which the customer selects to communicate his desire for in-store preview. In one embodiment, the customer may be prompted to enter his location, such as submitting a city, address and/or zip code, in order to identify the nearest brick-and-mortar partner in the area. The customer may save this or any other store in his profile, which will be remembered for future shopping experiences. In one embodiment, a GPS locator is employed to pinpoint the customer's exact location. System 400 automatically processes the location information and updates the webpage to shown the nearest local retailer.

System 400 transmits 604 one or more local retailers that are proximate to the customer's location and receives 606 a selection of a particular local retailer. System 400 also transmits 608 a request for the customer to input a payment for the selected jewelry item in order to secure a preview. Payment information may be received 610 in any number of formats, such as credit card, bank account, a pre-established funds account, and the like.

In one embodiment, system 400 transmits 612 the payment to a verification server, which verifies various aspects of the customer's provided payment, such as sufficiency of funds, accurate information, etc. System 400 then receive 614 a verification acknowledgement from the verification server. Once the customer's payment has been received 610 and verified 612, 614, information regarding the selected jewelry item is transmitted 616 to the online merchant, who packages and ships the selected jewelry item to the selected local retailer's store.

In one embodiment, the customer receives an indictor that provides a future date and time in which the jewelry item will be available for preview at the local partner's store. There may be a window of time provided, such as a one week period, before the jewelry item is return to the on-line jewelry provider. In one embodiment, the customer may reserve via the website a specific time to meet with an on-site salesperson. In one embodiment, a sales associate at the local partner's store contacts the customer to schedule a preview. In another embodiment, the customer stop by the local partner's store during regular store hours and asks to preview the selected jewelry item.

The customer may be performing the online jewelry transactions using any number of computing devices, such as a desktop computer, laptop computer, mobile device (e.g. smartphone, tablet, wearable technology). When visiting a local brick-and-mortar store, the customer may wish to bring various online records from his online shopping experience with him to the store. The online record may include information provided on the webpages or additional notations made by the customer.

Referring back to FIG. 6, system 400 also may store 618 an online record of the customer's online activities, selected items, persona notes into a virtual wallet. In one embodiment, the customer installs a pass application on his mobile device. The pass application may be any suitable application (e.g., Google Wallet by Google, Inc., Passbook by Apple Inc., Windows Phone Wallet by Microsoft Corp., etc.) that is accessible by the customer's mobile device for storing and utilizing various types of information relating to a customer's online searches and earmarked jewelry items. Pass application may act as a digital wallet for enabling the customer to bring an online record of his searches and/or earmarked jewelry items to the local retailer.

In some situations, a customer desires to transfer information from another computing device to a mobile device (e.g., a desktop computer to a smartphone). In one embodiment, the portable electronic device comprises a near field communication ("NFC") component that enables a fast and efficient capture of the relevant information. The customer simply taps or brings his mobile device in close proximity to the other computing device in order to transfer the information. In one embodiment, the pass application is installed on both devices, so that when the devices are synced, information that is stored from one device is transmitted to the other.

Once the customer enters a store, the information may be retrieved 620 from the virtual wallet and uploaded onto the store's computing device, using any suitable output component or antenna. In one embodiment, the online record is electronically embedded in an identifier, which is scanned by the local retailer from the customer's mobile device.

The identifier can be represented by any number of formats, such as any number of matrix barcodes (e.g., shot code, qode, high capacity color barcode, visual cryptogram), quick response (QR) code, 1-D barcodes, 3-D barcodes and the like. The identifier may be embedded with a plurality of information that is relevant to both the jewelry item and the customer. In one embodiment, the identifier is embedded with detailed information about the jewelry item that is being shipped to the local partner. Such information may include specific details about the jewelry item, such as price, style, brand, weight, color, value, gemstone source. A local partner store would be able to have knowledge about the content inside the shipping package without opening the package. In one embodiment, scanning the identifier automatically inputs the relevant information into the computer system in the store.

In another embodiment, the identifier may be embedded with personal information about the customer who ordered the jewelry item. Such personal information may include the customer's demographics, shopping preferences, recent searches, previous purchases, desired price range, saved searches, and the like.

In traditional in-store shopping experience, a sales associates gets to know a customer while helping him or her try on various jewelry item. Through the course of their conversation and observation of the customer's shopping preferences in the store, the sales associate is able to tailor and suggest jewelry items that are aligned within the customer's interest and budget. By contrast, for a sales associate who is meeting with an online customer who requested in-store preview, she is often meeting the customer for the firs-time during the in-store preview. As such, the embedded personal information may allow the store to further customize the in-store shopping experience for the customer when he enters the retail establishment.

In some embodiments, the information embedded in the identifier may inform the sales associate about shopping habits of the customer. For example, the store may be alerted in advance that the customer has been shopping for diamond engagement rings within the $5000-10,000 price range. As such, the store may attempt to align a sales associate that specializes in diamond engagement rings to meet with the customer. Furthermore, if a sales associates has some prior knowledge of the customer' shopping preferences and recent searches, she might be able to better guide the customer is his selection of a jewelry item. In providing sales associates with detailed insight into the customer, the jewelry provider is able to replicate the in-store shopping experience for its online customer.

Typically, the local partner is an establish jewelry store, such as Long's Jewelers, that carries its own inventory of jewelry items. The local partner, however, may also have a portion of the store that is dedicated for the in-store preview experience from the online jewelry provider. In some embodiments, the online jewelry provider rents a portion of the local partner's store in order to establish the in-store preview area.

Ble-Enhanced Technologies

Figure 7:
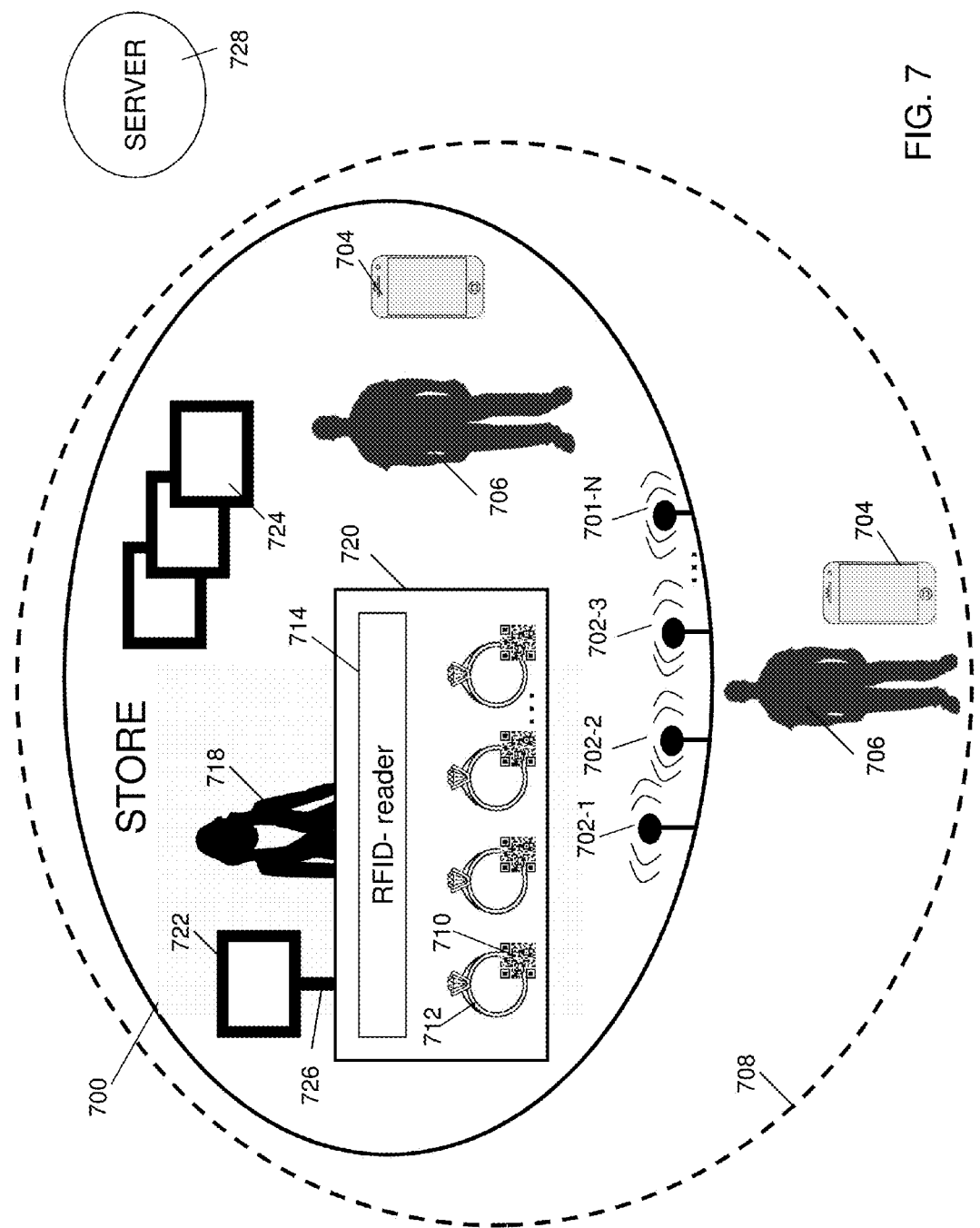
FIG. 7 illustrates an example of a local brick-and-mortar store with various technologies that enhance and collaborate with the online shopping experience.

FIG. 7 illustrates an example of a local brick-and-mortar store 700, including various technologies that may be available to enhance and collaborate with the online shopping experience of system 400. One such technology illustrated in the exemplary example of FIG. 7 is that of system 400 utilizing proximity Bluetooth Low Energy (BLE) technology, such as iBeacon by Apple, Inc. and Gimbal by Qualcomm, Inc., etc. As shown in FIG. 7, system 400 may have one or more beacons 702-1 through 702-N, which are located within store 700.

Beacons 702-1 through 702-N are capable of detecting when mobile device 704 of customer 706 is within a determined proximity to store 700. After mobile device 704 is detected (or "discovered), a connection is established between beacon(s) 702-1 through 702-N and mobile device 704. Packets of data may be transmitted from beacon(s) 702-1 through 702-N to detected mobile device 704.

The proximity at which customer 706 might receive a notification can be a set distance or a variable one. In one embodiment, the proximity is adjustable by customer 706. In another embodiment, customer 706 has the option to turn off the beacon feature on mobile device 704. The notification send to customer 706 can be any known type of notification, such as a push notification, text message, e-mail, an image, a video recording, an audio recording, and the like.

Referring to both FIGS. 6 and 7, system 400 may continually check 622 for notification triggers, and after detecting 624 a trigger, system 400 automatically send 626 a notification to customer 706. The triggers may be generic to every customer, such as a promotion, advertisement, and the like. The triggers also may be specific to customer 706, such as information concerning the availability of earmarked jewelry items or that a favorite sales associate is currently working within store 700.

To implement proximity notifications, geo-fence 708 can be used. Geo-fence 708 is a virtual perimeter for a real world geographic area. The perimeter can be around a set location such as a building, such as store 700. As illustrated in FIG. 7, system 400 can be configured so that anytime the location of customer 706 is determined to be within geo-fence 708, one or more notifications are sent to customer 706. The location of customer 706 is determined by the location of his mobile device 704, which is location aware. In one embodiment, the location of store 700 can be determined by accessing a geo-location database. In another embodiment, the location of store 700 can be stored in the customer's virtual wallet.

In some embodiments, customer 706 can be sent 626 a notification that a particular earmarked jewelry item is on display within store 700. As described above, when customer 700 is shopping online for a particular jewelry item, he may earmark certain pieces as "favorites," which are then stored, via the pass application, in a virtual wallet. When customer 706 enter within the zone of geo-fence 706, beacons 702-1 through 702-N within store 700 will review the data store in the virtual wallet. Beacon 702-11 through 702-N automatically will send 626 various notifications to customer 706 because on the information detected in his virtual wallet.

In one embodiment, system 400 sends 626 a notification to customer 706, indicating that the requested jewelry item has arrive in store 700. In another embodiment, system 400 sends 626 a notification to customer 706 that indicates a particular employee, such as an appraiser or a favorite sales associate, is working in store 700 at that moment. In another embodiment, system 400 sends 626 a notification detailing the employees who are currently working in store 700 that day. In another embodiment, an advertisement or promotion may be sent 626 to customer 706. For example, system 400 may send 626 a notification indicating a Mother's Day special or that a new design is now available. In another embodiment, customer 706 may be sent 626 reminder notification, such as maintenance reminders, cleaning reminders, and the like. In another embodiment, customer 706 may store important dates, such as anniversaries, birthdays, special holidays, graduations, in the pass application. Upon detection by beacons 702-1 through 702-N, a message may be sent, such as one stating, "Your wife is celebrating her birthday this Saturday. Come inside our store and purchase the sapphire ring she has been admiring."

In another embodiment, system 400 utilizes beacons 702-1 through 702-N to install a temporary location specific content service into the customer's mobile device 704. The temporary location specific content enables content, such as applications, to automatically appear and disappear on mobile device 704 depending on its location. The customer is permitted to view and/or interact with the temporarily installed application while within the vicinity of a predefined location. Once customer 706 leaves the particular location, such as moves outside geo-fence 708, the application is automatically uninstalled from mobile device 704. These features enable mobile device 704 to make applications available when and where they are most useful to customer 706, and helps customer 706 avoid clogging up mobile device 704 with too many applications. When mobile device 704 is laden with too many applications, the processing time increases and efficiency reduces for mobile device 704. The battery life of mobile device 704 also is quickly deplete by the installation of extraneous permanent applications.

According to one embodiment, once location information for the mobile device is identified, content associated with the location could be identified by server 728, which receives the location information from GPS location of mobile device 704. Server 728 could include a location mapping service. The location mapping service could include one or more databases that include one or more location/content tables that correlate geographical locations to content to identify content, if any, that should be transmitted to mobile device 704, while mobile device 704 is at or near a particular location identified by the location information. Additional details about a location specific content service may be found in U.S. Publication No. 2010/0120450, entitled "Location Specific Content," which is incorporated by reference in its entirety.

RFID-Enhanced System

Another technology illustrated in the exemplary example of FIG. 7 is that of system 400 incorporating a RFID-reader system to create a seamless transition from online shopping to in-store preview for customer 706. RFID tag 710 may be attached to each jewelry item 712 that is displayed within store 700.

In one embodiment, RFID tag 710 is composed of an tiny tag-chip, such as an integrated circuit and is connected to an antenna. The tag chip contains memory which stores the product's electronic product code (EPC) and other information about jewelry item 712, such as price, carat weight, inclusions, source of the diamond. RFID tag 710 communicates with RFID-reader 714, which is a network connected device with an antenna that sends power as well as data and commands. RFID-reader 714 acts like an access point for the RFID tagged items so that the tags' data can be made available to various business applications in system 400.

RFID-reader 714 may appear in any number of formats. In the illustrated embodiment shown in FIG. 7, RFID-reader 714 is shown as an antenna mat reader. However, RFID-reader 714 may be designed in any number of format, including a wearable technology (e.g., bracelet, watch or glove) that is being worn by sales associate 718.

RFID-reader 714 may be located proximate to jewelry counter 720, so that when sales associate 718 removes jewelry item 712 from the display case, RFID tag 710 will be automatically detected 628 by RFID-reader 714. Information embedded in tag 710 is retrieved 630 and transmitted 632 to RFID-reader 714. In one embodiment, RFID-reader 714 is affixed to jewelry counter 720. Furthermore, RFID-reader 714 is in wireless communication with a store-owned electronic device 722, which receives and displays the data being transmitting from RFID-reader 714. System 400 transmits 632 to the RFID-reader, which in turn, transmits 634 the information to store-owned electronic device 722. Both customer 706 and sales associate 718 can view the data being displayed on electronic device 722 in real-time. The example illustrated in FIG. 7 depicts electronic device 722 as a tablet that is mounted to jewelry counter 720. But any number of devices, as previously described, may be used in this set-up.

In some embodiments, RFID-reader 714 is hidden from the customer's view, so that customer 706 only experiences watching sales associate 718 retrieve jewelry item 712 and automatically seeing the relevant information about jewelry item 712 seamlessly appears on electronic device 722. In some embodiments, some of the information displayed on store-owned electronic device 722, includes information that customer 706 had saved in his virtual wallet. In this manner, sales associates 718 and customer 706 may build upon the online research performed by customer 706 prior to visiting store 700. One some embodiments, sales associate 718 and customer 706 already may have been communicating via a virtual interactive communication, and the parties interaction within store 700 is an extension of the original relationship.

In one embodiment, electronic device 722 is affixed to jewelry counter 720. In another embodiment, electronic device 722 is removably mounted to jewelry counter 720, and thus it is capable of being moved around to various locations within store 700. In another embodiment, store 700 offers a number of complimentary electronic devices 724, which in FIG. 7 is shown as tablets, but any type of mobile device may be used. Customer 706 may walk around store 700 with these electronic devices 724, and when customer 706 decides to work with sales associate 718, he can mount the complimentary electronic device 724 on support 726 that is affixed to jewelry counter 720.

In another embodiment, customer 706 may opt to use his personal mobile device 704 in lieu of store-owned electronic device 722 or complimentary electronic device 724. In yet another embodiment, a RFID-reader is built into personal mobile device 704.

Customer 706 may independently browse the various items in store 700, and upon finding something of interest, he scans jewelry tag 710 to obtain the relevant information. For example, customer 706 see a ruby necklace that he is interested in learning more information (e.g., price). Rather than waiting for sales associate 718 for assistance, customer 706 scans tag 710 associates with the ruby necklace. Information regarding the ruby necklace will automatically be displayed on the customer's device 502. If the customer desires to work with sales associate 718, he may make an indication on either mobile device 704. By allowing customer 706 to independently access information about jewelry item, customer 706 is able to shop under a low pressure situation. Sales associate 718 also is allowed to maximize her time assisting customer for are further along in the shopping process.

In one embodiment, the store has a number of attachable microscope lenses 512, which customer 706 may attach to either complimentary electronic device 724 or personal mobile device 704. Customer 706 is able to view additional details of jewelry items, such as inclusions on a diamond, using these portable mobile devices.

Although thus far, RFID-reader 714 is described as communicating directly with store-owned electronic device 722, it also is possible that the RFID-reader 714 communicates with personal mobile device 704, which is owned by customer 706. In another embodiment, all of the devices within store 700 communicate through central server 728, which is managed off-site by the online jewelry merchant. Data that is transmitted between each of these devices are stored in a cloud storage at server 728.

Referring back to FIG. 6, after customer 706 has previewed the selected jewelry items, system 400 may receive 636 an indication that customer 706 wishes to purchase the selected jewelry item or receive 638 an indication that customer 706 does not wish to purchase the selected jewelry items.

If customer 706 wishes to purchase the selected jewelry item, he simply goes home from store 700 with the jewelry item. System 400 receives 636 an indication from the local retailer of the purchase by customer 706. System 400 then charges 640 the payment that was on file. In one embodiment, customer 706 may request to change the form of payment that is used to pay for the selected jewelry item.

However, if the customer is no longer interested in the selected jewelry item, then system 400 will receive 638 a message from the local retailer, indicating the decision not to purchase. System 400 then releases 642 the payment hold on the customer's account.

Referring back to the example illustrated in FIG. 7, in one embodiment, electronic device 722 retains a record of the customer's visit, such as keeping track of the jewelry items examined and information associated with each of the selected jewelry items.

Device 722 also may keep track of the customer's shopping preferences while in the store. For example, device 722 may record any jewelry item that the customer scans and stores this information in the customer's in-store record. In one embodiment, sales associate 718 logs onto system 400, she can quickly ascertain a quick preview of the customer's in-store record to get a sense of customer 706. In another embodiment, customer 706 can retain a copy of his in-store record in order to help facilitate any future online shopping after the store visit. In one embodiment, device 722 stores the information onto the in-store record without the customer's input. In another embodiment, customer 706 active adds, edits and removes information that are updated to his in-store record in real time.

In one embodiment, the customer uses the NFC feature and pass application on personal mobile device 704, in order to store the in-store record onto his virtual wallet. In one embodiment, the in-store record is embedded into a barcode, QR code, and the like, and the customer simply scans the barcode to upload the information onto his virtual wallet. In another embodiment, customer 706 provides an email address to sales associate 718, who emails the in-store record to customer 706. In another embodiment, the in-store record is saved into the customer's profile, which is accessible through the website of the online merchant.

In one embodiment, device 502 stores the information without the customer's input. In another embodiment, a customer may use device 502 to store jewelry pieces of interest to a customer profile associated with the online jewelry provider. For example, the customer may narrow his search to three different engagement rings, but not being ready to purchase yet, he may choose to keep a record of his in-store visit and store the information on his customer profile, which he can retrieve at a later time.

Device 502 also may allow the customer to upload the website for the on-line provider. The customer may have the option of comparing the jewelry item that is in the store with other inventory that is available through the online jewelry provider.

Additional Embodiments

A. A method for previewing a jewelry item at a local retailer store, in which the method comprises: detecting a RFID tag that is coupled to the jewelry item, in which the RFID tag is proximate to a RFID reader that is capable to receiving information from the RFID tag, in which the RFID tag is embedded with information that is unique to the jewelry item; in response to detecting the RFID tag, automatically receiving, via the RFID reader, the information that is unique to the jewelry item, in which the RFID reader and the RFID tag are in wireless communication over a network; and transmitting the information to an electronic device that is located proximately to a jewelry counter, in which the electronic device displays the information on a display.

A.1. The method of claim A, in which the RFID reader is an antenna mat. A.2. The method of claim A, in which the RFID reader is a wearable technology. A.2.1. The method of claim A.2., in which the wearable technology is a watch. A.2.2. The method of claim A.2., in which the wearable technology is a bracelet. A.2.3. The method of claim A.2., in which the wearable technology is a glove. A.2.4. The method of claim A.2., in which the wearable technology is a virtual optical display.

A.3. The method of claim A, in which the electronic device is mounted to the jewelry counter. A.4. The method of claim A, in which the electronic device comprises a display, in which the display is viewable by the customer. A.5. The method of claim A, in which the electronic device is a mobile device. A.5.1. The method of claim A.5., in which the mobile device is a tablet. A.5.2. The method of claim A.5., in which the mobile device is owned by the local retailer store. A.5.3. The method of claim A.5., in which the mobile device a personal mobile device belonging to the customer. A.5.4. The method of claim A.5., in which the mobile device is a smartphone. A.5.5. The method of claim A.5., in which the personal mobile device is a wearable technology. A.5.5.1. The method of claim A.5.5., in which the wearable technology is a watch. A.5.5.2. The method of claim A.5., in which the wearable technology is a virtual optical display. A.5.5.3. The method of claim A.5., in which the wearable technology is a glove. A.5.5.4. The method of claim A.5., in which the wearable technology is a bracelet.

A.6. The method of claim A, in which the display is viewable by a customer and a sales associate. A.7. The method of claim A further comprising: receiving a selection of the jewelry item from a customer; receiving a request for in-store preview of the selected jewelry item; in response to the request for in-store preview, transmitting an indication of at least one local retailer who is located proximate to the customer; receiving a selection from the customer of a local retailer; transmitting information about the selected jewelry item to the local retailer.

A.7.1. The method of claim A.7. further comprising: detecting a location of the customer based on a location of the customer's mobile device, in which the mobile device comprises a GPS locator; detecting a location for the at least one local retailer; and computing a distance between the customer and the at least one local retailer. A.7.2. The method of claim A.7. further comprising: requesting a payment from the customer to secure the selected jewelry item; receiving the payment; transmitting the payment to a verification server; receiving, from the verification server, confirmation about the payment; and authorizing the transmission of the information to the local retailer.

A.8. The method of claim A further comprising: receiving a request to store an online record onto the customer's mobile device, in which the online record comprises information pertaining to online activities of the customer on a website of a jewelry merchant; storing the online record in a virtual wallet. A.8.1. The method of claim A, in which the virtual wallet is store on the customer's mobile device. A.8.1. The method of claim A, in which the virtual wallet is associated with a pass application that is installed on the customer's mobile device. A.8.2. The method of claim A, in which information stored on the virtual wallet may be retrieved by the local retailer. A.8.2.1. The method of claim A.8.2., in which the retrieved information is transmitted to an electronic device owned by the local retailer. A.8.3. The method of claim A further comprising: detecting a trigger in the virtual wallet of the customer through at least one beacon; in response to detecting the trigger, transmitting a notification to the customer's mobile device.

B. An apparatus comprising: a processor; and a memory, in which the memory stores instructions which, when executed by the processor, direct the processor to: detect a RFID tag that is coupled to the jewelry item, in which the RFID tag is proximate to a RFID reader that is capable to receiving information from the RFID tag, in which the RFID tag is embedded with information that is unique to the jewelry item; in response to detecting the RFID tag, automatically receive, via the RFID reader, the information that is unique to the jewelry item, in which the RFID reader and the RFID tag are in wireless communication over a network; and transmit the information to an electronic device that is located proximately to a jewelry counter, in which the electronic device displays the information on a display.

C. An article of manufacture comprising: a computer-readable medium that is non-transitory, in which the computer-readable medium stores instructions which, when executed by a processor, direct the processor to: detect a RFID tag that is coupled to the jewelry item, in which the RFID tag is proximate to a RFID reader that is capable to receiving information from the RFID tag, in which the RFID tag is embedded with information that is unique to the jewelry item; in response to detecting the RFID tag, automatically receive, via the RFID reader, the information that is unique to the jewelry item, in which the RFID reader and the RFID tag are in wireless communication over a network; and transmit the information to an electronic device that is located proximately to a jewelry counter, in which the electronic device displays the information on a display.

What is claimed:

1. A method comprising:
   causing information about a jewelry item to be stored in a database entry of an account of a user stored in a non-transitory computer-readable storage medium;
   after storing the information in the database entry, detecting, by at least one processor of at least one computer in electronic communication with a plurality of other computers via an electronic communications network, a mobile device associated with the user;
   responsive to detecting the mobile device associated with the user, identifying the jewelry item stored in the database entry of the account of the user, in which the jewelry item is in a first location;
   after identifying the jewelry item stored in the database entry of the account of the user, detecting, by at least one processor of at least one computer in electronic communication with a sensor, an (Radio Frequency Identification) RFID tag that is coupled to the jewelry item when the jewelry item is moved to a second location different from the first location, in which the RFID tag is proximate to an RFID reader that is capable of receiving information from the RFID tag when the jewelry item is in the second location, in which the RFID tag is embedded with information that is unique to the jewelry item;
   in response to detecting the RFID tag when the jewelry item is in the second location, automatically receiving, via the RFID reader, the information that is unique to the jewelry item, in which the RFID reader and the RFID tag are in wireless communication over a network; and
   after the information that is unique to the jewelry item is automatically received via the RFID reader, transmitting the received information to an electronic device that is located proximately to a jewelry counter, in which the electronic device displays the information on a display, and in which the electronic device is physically distinct from the RFID reader.

2. The method of claim 1, in which the RFID reader is an antenna mat.

3. The method of claim 1, in which the RFID reader is a wearable technology.

4. The method of claim 1, in which the electronic device is mounted to the jewelry counter.

5. The method of claim 1, in which the electronic device comprises a display, in which the display is viewable by a customer, and in which the electronic device comprises a mobile device.

6. The method of claim 1, in which the electronic device is a tablet.

7. The method of claim 1, in which the electronic device is a personal electronic device of a customer.

8. The method of claim 7, in which the personal electronic device is a wearable technology.

9. The method of claim 7, in which the act of transmitting the information to an electronic device that is located proximately to a jewelry counter occurs responsive to a determination that the electronic device is located proximately to a jewelry counter, and in which the jewelry counter comprises a plurality of jewelry items offered for sale and for display to a plurality of customers.

10. The method of claim 7,
   in which the jewelry item is offered for sale at the jewelry counter located proximately to the electronic device, and
   in which the act of transmitting the information to an electronic device that is located proximately to the jewelry counter occurs responsive to a determination that the electronic device is located proximately to the jewelry counter at which the jewelry item is offered for sale.

11. An apparatus comprising:
    at least one processor; and
    at least one memory having instructions stored thereon which, when executed by the at least one processor, direct the at least one processor to:
      cause information about a jewelry item to be stored in a database entry of an account of a user stored in a non-transitory computer-readable storage medium;
      after storing the information in the database entry, detect a mobile device associated with the user;
      responsive to detecting the mobile device associated with the user, identify the jewelry item stored in the database entry of the account of the user, in which the jewelry item is in a first location;
      after identifying the jewelry item stored in the database entry of the account of the user, detect an (Radio Frequency Identification) RFID tag that is coupled to the jewelry item when the jewelry item is moved to a second location different from the first location, in which the RFID tag is proximate to an RFID reader that is capable of receiving information from the RFID tag when the jewelry item is in the second location, in which the RFID tag is embedded with information that is unique to the jewelry item;
      in response to detecting the RFID tag when the jewelry item is in the second location, automatically receive, via the RFID reader, the information that is unique to the jewelry item, in which the RFID reader and the RFID tag are in wireless communication over a network; and
      transmit the information to an electronic device that is located proximately to a jewelry counter comprising a plurality of jewelry items displayed for sale to a plurality of customers, in which the electronic device displays the information on a display, and in which the electronic device is physically distinct from the RFID reader.

12. The apparatus of claim 11, in which the RFID reader is an antenna mat.

13. The apparatus of claim 11, in which the RFID reader is a wearable device.

14. The apparatus of claim 11, in which the electronic device is mounted to the jewelry counter.

15. The apparatus of claim 11, in which the electronic device comprises a display, in which the display is viewable by a customer, and in which the electronic device comprises a mobile device.

16. The apparatus of claim 11, in which the electronic device is a tablet.

17. The apparatus of claim 11, in which the electronic device is a personal electronic device of a customer.

18. The apparatus of claim 11, in which the act of transmitting the information to an electronic device that is located proximately to a jewelry counter occurs responsive to a determination that the electronic device is located proximately to a jewelry counter.

19. The apparatus of claim 11,
in which the jewelry item is located in the jewelry counter, and
in which the act of transmitting the information to an electronic device that is located proximately to a jewelry counter occurs responsive to a determination that the electronic device is located proximately to the jewelry counter in which the jewelry item is located.

20. A non-transitory machine-readable medium having instructions stored thereon which, when executed by at least one processor, direct the at least one processor to:
cause information about a jewelry item to be stored in a database entry of an account of a user stored in a non-transitory computer-readable storage medium;
after storing the information in the database entry, detect a mobile device associated with the user;
responsive to detecting the mobile device associated with the user, identify the jewelry item stored in the database entry of the account of the user, in which the jewelry item is in a first location;
after identifying the jewelry item stored in the database entry of the account of the user, detect an (Radio Frequency Identification) RFID tag that is coupled to the jewelry item when the jewelry item is moved to a second location different from the first location, in which the RFID tag is proximate to an RFID reader that is capable of receiving information from the RFID tag when the jewelry item is in the second location, in which the RFID tag is embedded with information that is unique to the jewelry item;
in response to detecting the RFID tag when the jewelry item is in the second location, automatically receive, via the RFID reader, the information that is unique to the jewelry item, in which the RFID reader and the RFID tag are in wireless communication over a network;
determine that an electronic device is located proximately to a jewelry counter in which the jewelry item is located; and
transmit the information to the electronic device that is located proximately to the jewelry counter, in which the electronic device displays the information on a display, and in which the electronic device is physically distinct from the RFID reader.

* * * * *